(12) United States Patent
    Steinwender et al.

(10) Patent No.: US 11,920,665 B2
(45) Date of Patent: Mar. 5, 2024

(54) DIFFERENTIAL

(71) Applicant: MAGNA Powertrain GmbH & Co KG, Lannach (AT)

(72) Inventors: Herbert Steinwender, Haselsdorf-Tobelbad (AT); Kristian Rois, Frohnleiten (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 0 days.

(21) Appl. No.: 18/302,024

(22) Filed: Apr. 18, 2023

(65) Prior Publication Data

US 2023/0341037 A1    Oct. 26, 2023

(30) Foreign Application Priority Data

Apr. 21, 2022   (DE) ..................... 10 2022 203 901.7

(51) Int. Cl.
| | |
|---|---|
| *F16H 48/24* | (2006.01) |
| *F16H 48/08* | (2006.01) |
| *F16H 48/34* | (2012.01) |
| *F16H 48/40* | (2012.01) |

(52) U.S. Cl.
CPC ............ *F16H 48/24* (2013.01); *F16H 48/08* (2013.01); *F16H 48/34* (2013.01); *F16H 48/40* (2013.01)

(58) Field of Classification Search
CPC .......... F16H 48/24; F16H 48/08; F16H 48/34; F16H 48/40
See application file for complete search history.

(56) References Cited

U.S. PATENT DOCUMENTS

| | | | | |
|---|---|---|---|---|
| 6,460,677 | B1 * | 10/2002 | Roscoe .................... | F16H 48/34 |
| | | | | 192/93 A |
| 9,797,495 | B2 * | 10/2017 | Inose ..................... | F16D 27/108 |
| 2018/0029471 | A1 * | 2/2018 | Richards ................. | F16H 48/38 |
| 2018/0370356 | A1 | 12/2018 | Shigeta et al. | |
| 2019/0309804 | A1 * | 10/2019 | Shibata .................. | B60K 17/02 |

FOREIGN PATENT DOCUMENTS

| | | |
|---|---|---|
| DE | 653814 C | 12/1937 |
| DE | 3733153 A1 | 4/1989 |
| DE | 4002053 A1 | 7/1990 |
| DE | 102009056087 A1 | 6/2011 |
| DE | 102017116947 A1 | 2/2018 |
| DE | 202020100984 U1 | 6/2020 |
| DE | 102019208345 B4 | 7/2022 |
| DE | 102021213011 B3 | 10/2022 |
| WO | WO-2017017805 A1 * | 2/2017 ............ F16H 48/08 |
| WO | 2018044493 A1 | 3/2018 |

* cited by examiner

*Primary Examiner* — Justin Holmes
(74) *Attorney, Agent, or Firm* — Dickinson Wright PLLC

(57) ABSTRACT

A differential having a circulating carrier with drive gearwheel, at least two planet gearwheels rotatably mounted in the circulating carrier, with lateral gearwheels leading to side shafts of the drive axle of a vehicle and enmeshing with the planet gearwheels, wherein one lateral gearwheel can be connected either to the associated side shaft or to the circulating carrier via a coupling arrangement. The coupling arrangement is located between the circulating carrier and the side shaft and includes an actuator sleeve with an axially active claw coupling towards the lateral gearwheel and a radially active sliding toothing towards the side shaft.

20 Claims, 6 Drawing Sheets

DIFFERENTIAL

CROSS-REFERENCE TO RELATED APPLICATIONS

Figure 1:
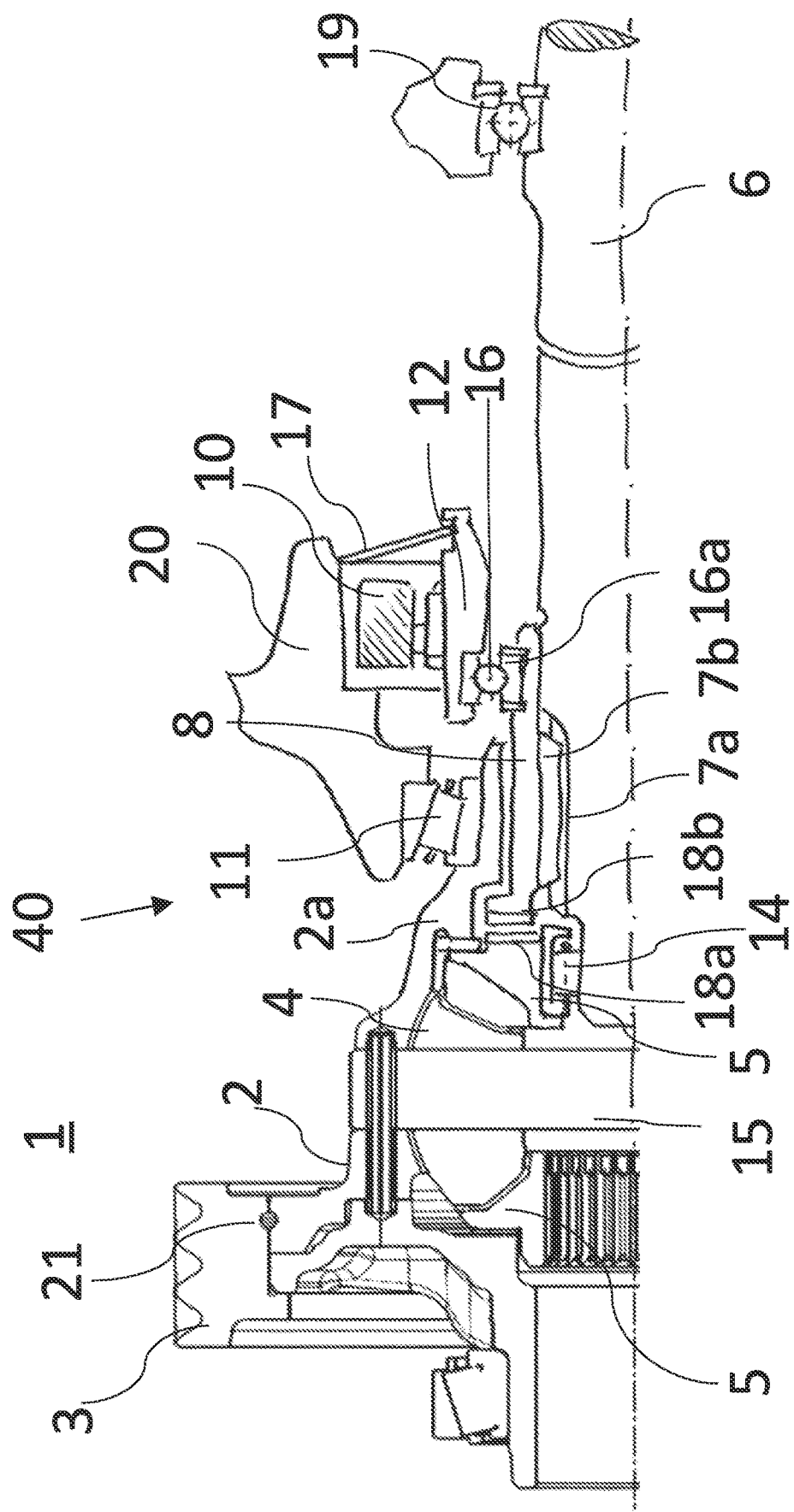

This application claims priority to German Application No. DE 10 2022 203 901.7, filed on Apr. 21, 2022 at the German Patent Office, and which is hereby incorporated by reference in its entirety.

TECHNICAL FIELD

The invention relates to a differential having a circulating carrier with a drive gear wheel, at least two planet carriers rotatably mounted in the circulating carrier, and with lateral gearwheels leading to side shafts of the drive axle of a vehicle and enmeshing with the planet carriers, wherein a lateral gearwheel can be connected either to the associated side shaft or to the circulating carrier via a coupling arrangement.

BACKGROUND OF THE INVENTION

This section provides information related to the present disclosure which is not necessarily prior art.

The maximum speed which can be achieved with an electric axle depends primarily on the gear ratio and the maximum rotation speed of the electric motor. The gear ratio of the electric axle must reflect a balanced ratio between torque and speed. High torques are necessary for good acceleration and driving dynamics, while an acceptable electric maximum speed is advantageous for motorway cruising. Too low a gear ratio leads firstly to too high a translation ratio, a large and heavy motor for delivering an appropriate torque. Possible solutions are electric multi-speed transmissions and electric axle drives, but the greater complexity, technical difficulty and costs in many cases prevent implementation. Single gear electric axles usually have translation ratios from 8 to 12, and the electric motors used today have maximum rotation speeds between 12,000 and 20,000 revolutions per minute. This means that hybrid vehicles, which usually travel more quickly, need a system which decouples the electric motor from the drive train in order to prevent overspeeding. A battery electric vehicle with only one primary drive source needs no decoupling system since the electric maximum speed corresponds to the maximum speed of the vehicle. However, in battery electric vehicles with two drive sources (primary electric axle for main drive and secondary electric axle for an additional drive), also a decoupling system for the unused electric machine is required, in order by decoupling the secondary electric axle to increase the efficiency of the overall drive if the drive via the primary drive axle is sufficient. When using a dual coupling differential, the implementation of a separating function is very simple. To allow this, both couplings can be completely opened so that the driveshafts can rotate freely.

However, a separating system can also be implemented in axles with conventional bevel gear differentials. One simple possibility is the use of a claw coupling at the interface between the driveshaft and a lateral gearwheel. Since a claw coupling must be synchronised, the rotation speeds of the motor and driveshaft must correlate precisely in order to allow re-engagement during travel. By means of the motor power electronics which know the rotation speed of the electrical machine, and the ABS, a control algorithm can be implemented.

DE 20 2020 100 984 U1 describes an electric drive axle with an electric motor, a gear arrangement, a differential and a separating device, wherein the gear arrangement is configured for generating a specific translation ratio between the electric motor and the differential, and wherein a pinion sleeve in the interior of a housing of the differential provides pre-control. The separating device comprises a piston element which is arranged concentrically inside an annular hub and the pinion sleeve. With this separating device, an annular structure is decoupled from the housing. Via this coupled structure, the entire torque of the drive is transmitted to the differential. Because this is an external ring, the installation size of the differential is larger. However, the diameter of the differential is decisive for the installation volume and also the weight of the arrangement.

DE 10 2017 116 947 A1 discloses a differential with a separating coupling between the lateral gearwheel of the differential and the assigned side shaft. Some of the complex actuators are arranged in the differential housing.

In view of the above, it is an object of the invention to create a compact and economic integration of the separation functionality and/or the locking function in a differential.

SUMMARY

This section provides a general summary of the disclosure, and is not intended to be interpreted as a comprehensive disclosure of its full scope or all of its features.

The object is achieved with a differential having a circulating carrier with drive gearwheel, at least two planet gearwheels rotatably mounted in the circulating carrier, lateral gearwheels leading to side shafts of a drive axle of a vehicle and which are enmeshed with the planet gearwheels, wherein one lateral gearwheel can be connected either to the associated side shaft or to the circulating carrier via a coupling arrangement, wherein the coupling arrangement includes an actuator sleeve mounted between the circulating carrier and the side shaft, the actuator sleeve having an axially active claw coupling towards the lateral gearwheel and a radially active sliding toothing towards the side shaft.

In this context, axial means along axis A, while radial means a direction perpendicular to axis A. The term "differential" means an arrangement with a differential and further connected components such as side shafts.

The solution requires no costly openings in the circulating carrier and requires no shift lever. The solution is economic and compact, which also brings a weight advantage.

The actuator sleeve is axially displaceable by means of an actuator arrangement along the radially active push-fit connection and is guided displaceably at one end via a claw toothing on the lateral gearwheel and the end pointing away from the differential via a grooved ball bearing.

The switching is actuated by a magnet with armature plate, wherein the magnet is arranged axially next to the circulating carrier.

For the locking function, the lateral gearwheel has an axially active claw coupling towards the actuator sleeve and a radially active sliding toothing towards the circulating carrier.

A separating function and a locking function are fitted one on each of the two side shafts.

The circulating carrier is split, and the part housing with the separating function is connected to the drive gearwheel via a press-fit or welding.

The circulating carrier is split and the part housing with the locking function is connected to the drive gearwheel exclusively via welding.

By integrating the separating and locking functions in the differential and by actuation via an actuating sleeve, the two functions are simplified with respect to installation space and cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
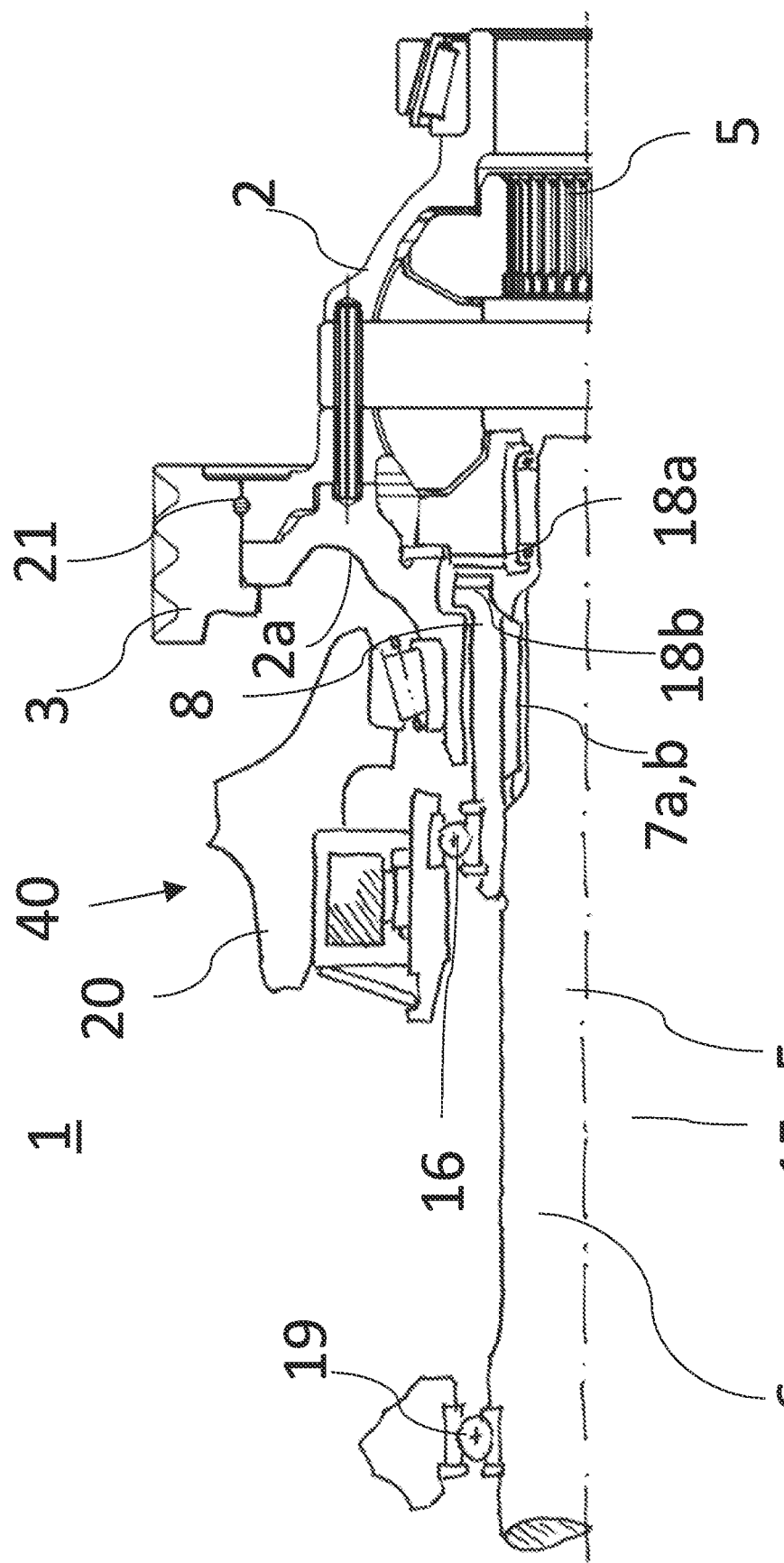
Figure 3:
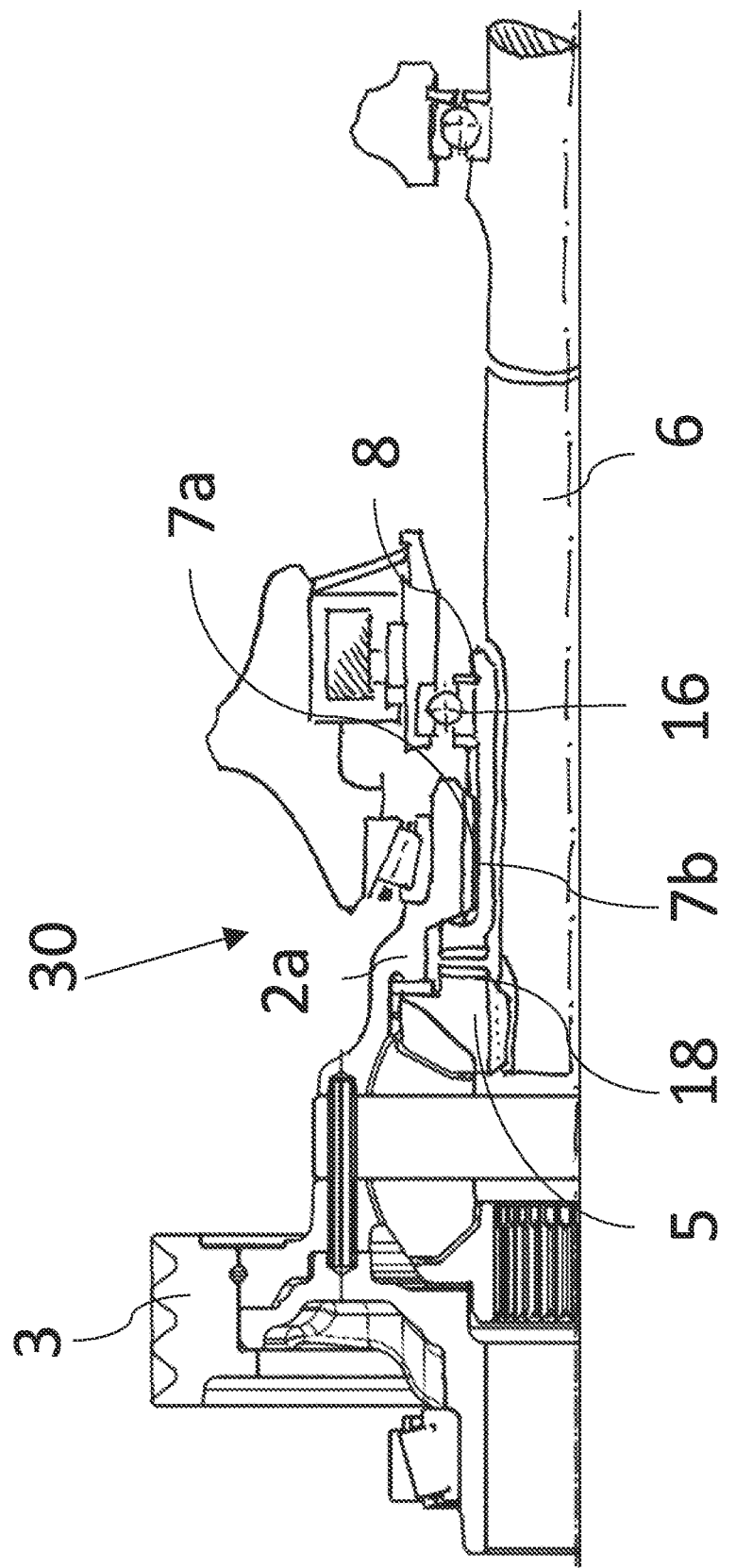
Figure 4:
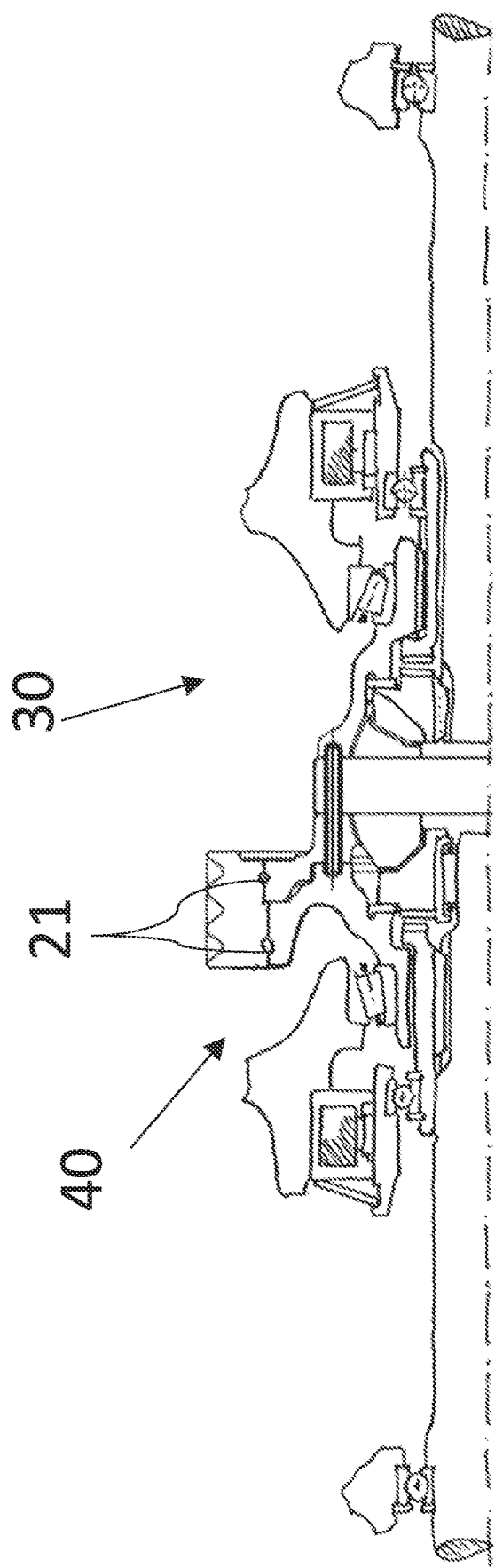
Figure 5:
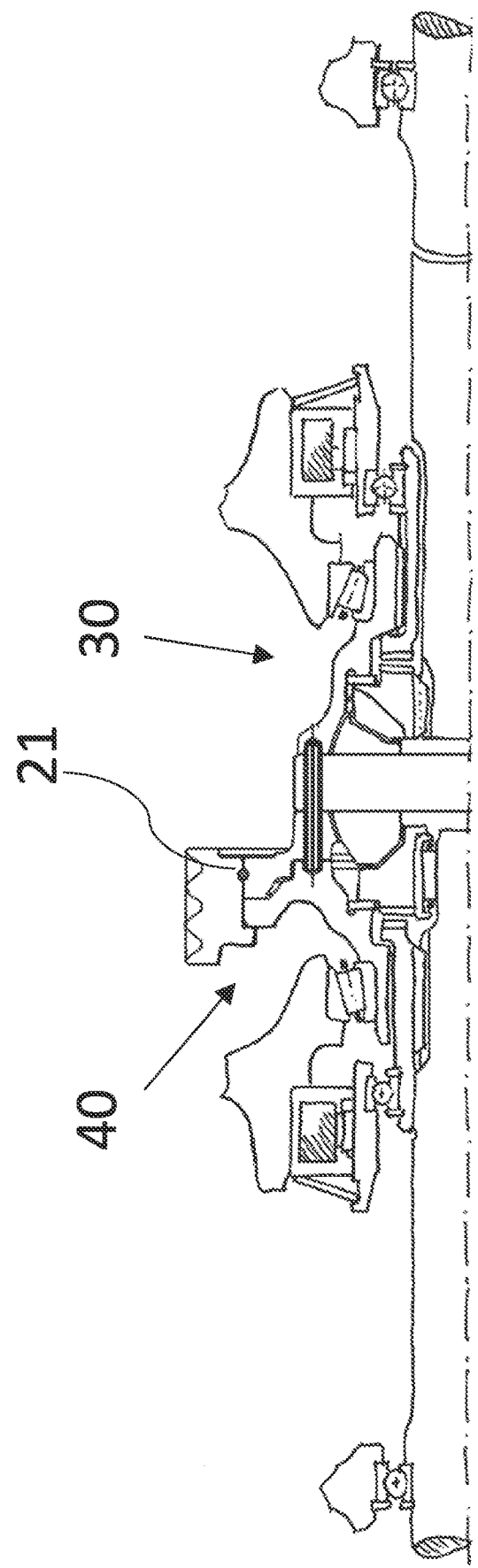
Figure 6:
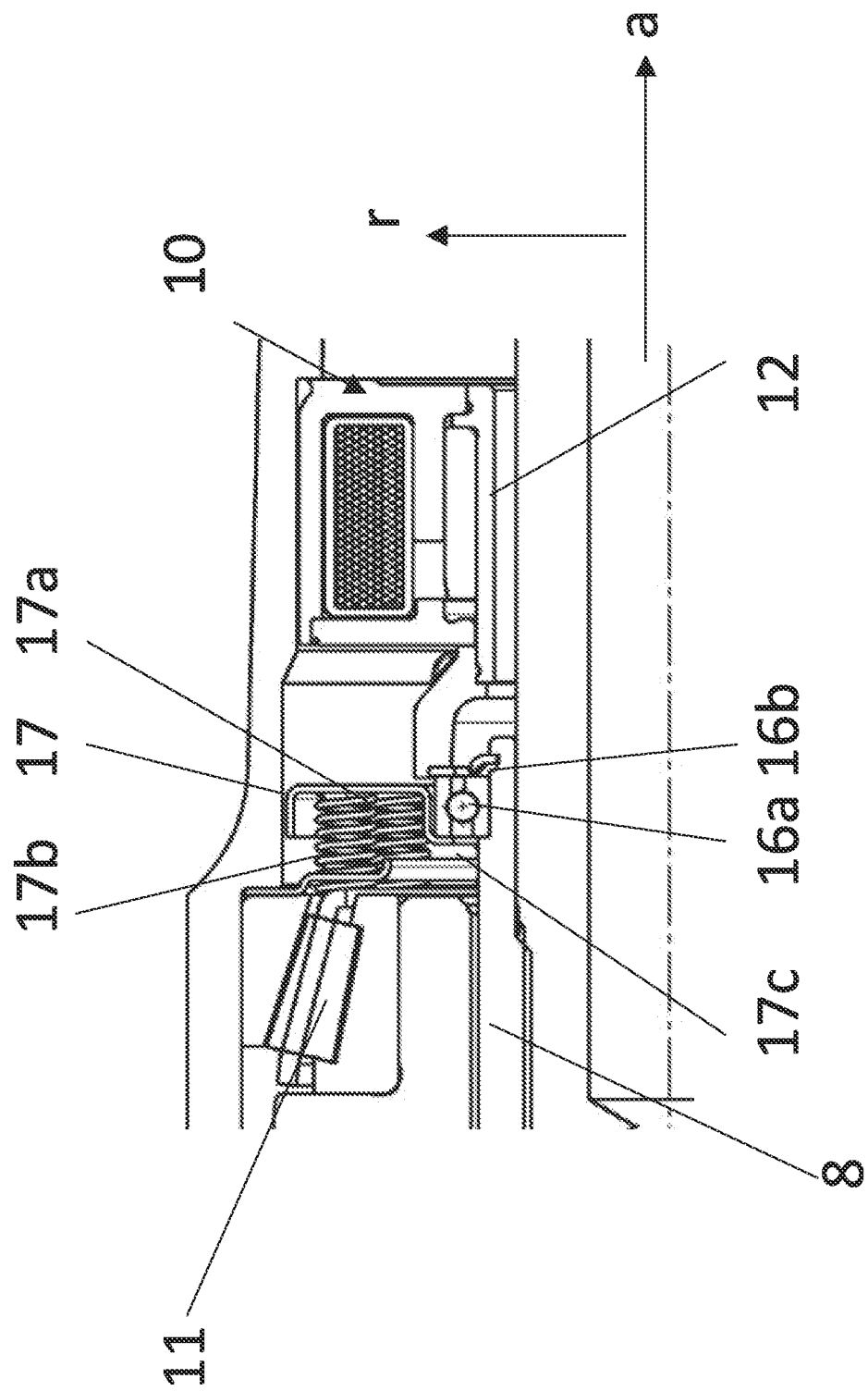

FIG. 1 shows a separating coupling in the circulating housing with weld connection to the drive gearwheel, FIG. 2 shows a separating coupling in the circulating carrier without weld connection, FIG. 3 shows a locking function in the circulating carrier with weld connection to the drive gearwheel, FIG. 4 shows a locking function and separating function integrated in separate circulating carriers, both with weld connections to the drive gearwheel, FIG. 5 shows a circulating carrier for a locking function with weld connection and a circulating carrier for a separating function without weld connection to the drive gearwheel, FIG. 6 shows an extract with a grooved ball bearing.

DETAILED DESCRIPTION OF THE INVENTION

FIG. 1 shows a differential 1 having a circulating carrier 2 which is mounted on a vehicle 20 via bearings 11 on both sides. The circulating carrier 2 has a toothing which forms a drive gearwheel 3. Thus, the circulating carrier 2 is connected to the driving machine of the vehicle.

The circulating carrier 2 is formed as a two-piece component, wherein the separation of the circulating carrier 2, to be regarded as a housing, takes place at a pin 15. Planet gearwheels 4 are rotatably mounted on the pin 15, wherein in this embodiment, two planet gearwheels 4 rotate about the pin 15. The planet gearwheels 4 each mesh via a bevel gearing with two output lateral gearwheels 5. The lateral gearwheel 5 shown on the left in the figure sits via a plain bearing in the housing, while the lateral gearwheel 5 on the right side is mounted on a needle roller bearing 14 which is arranged on a side shaft 6. The lateral gearwheel 5 on the side to be switched is formed with a claw toothing 18a.

In the region of the switchable lateral gearwheel 5, the circulating carrier 2 forms a stepped region 2a which also approaches the side shaft 6 in steps.

Within the stepped region, an actuator sleeve 8 is guided outward between the circulating carrier 2 and the side shaft 6. The stepping follows the component sequence in the differential 1, from the planet gearwheel 4 to the lateral gearwheel 5 to the actuator sleeve 8.

The actuator sleeve 8 consists of an end toothing in the axial direction, wherein e.g. a claw toothing 18b serves for connection to the lateral gearwheel 5 and the claw toothing 18a. Furthermore, the actuator sleeve 8 has a radial sliding toothing 7a. The radial sliding toothing 7a of the actuator sleeve faces an inner sliding toothing towards the side shaft 6, in order to constitute a separating function. The side shaft 6 is coupled with and decoupled from the lateral gearwheel 5 via its sliding toothing 7b.

The actuation of the actuator sleeve 8 via a lift magnet 10 and an armature ring 12 results in an axial shift of the actuator sleeve 8, hence of the claw coupling with the claw toothing 18b and takes place via a grooved ball bearing configured as a fixed bearing 16. The fixed bearing 16 may thus transmit actuating forces in both tension and compression.

In order to limit the play in the axial direction as far as possible on actuation, the outer ring 16a of the fixed bearing 16 may be over-moulded with plastic.

The armature ring 12 of the lift magnet 10 may also be over-moulded at the same time as the outer ring 16a. Also, the axial play may be additionally restricted by use of a grooved ball bearing 16 with reduced bearing clearance (class C1), which has a positive effect on the travel concept of the lift magnet.

A return spring 17 is arranged stationarily on the vehicle 20 or on the ring coil 13, itself stationary on the vehicle, and acts on the axially displaceable armature ring 12, and is therefore completely free from any differential rotation speed. In the simplest case, the return spring 17 may be formed as a compact cup spring or as a special form of a cup spring, but also as a coil spring.

The switchable lateral gearwheel 5 is radially mounted in the separating function 40 via a plain bearing seat or the radial needle roller bearing 14 on the side shaft 6. The lateral gearwheel 5 and actuator sleeve 8 are thus mounted on the side shaft 8 so as to be always centered relative to one another, and hence the end face claw coupling is always centered to the claw toothings 18a, 18b.

In a coupled state, the side shaft 6 is centred at its end oriented towards the vehicle wheel via the external grooved ball bearing 16, and at the other end in the differential 1 via the centring function of the toothing forces on the lateral gearwheel 5.

In a decoupled state, the end of the side shaft 6 closer to the differential 1 is centred via the fixed bearing 16, the grooved ball bearing and the actuators in the vehicle. Thus the side shaft 6 is held in the central position even without the centring function of the toothing forces in load-free state.

Alternatively, the radial guidance of the side shaft 6 close to the differential 1 may also be centred via a plain bearing point or further needle roller bearing between the actuator sleeve 8 and the circulating carrier 2, or via the outer diameter of the lateral gearwheel 5 in the circulating carrier.

In the embodiment of FIG. 1, the circulating carrier 2 is welded to the drive gearwheel 5 on the switchable side of the differential 1 via the weld 21.

The connection of the circulating carrier 2 in the separating function 40 may also take place via a press fit to the drive gearwheel 3, since no load-induced torque is transmitted between the actuator sleeve and the differential housing.

FIG. 2 shows the same arrangement for separating the lateral gearwheel from the side shaft as in FIG. 1. The only difference is that the separating function 40 is arranged on the housing part of the circulating carrier 2 which is not welded to the drive gearwheel 3.

FIG. 3 shows a separating coupling which can connect and separate between the lateral gearwheel 5 and the circulating carrier 2. For this, a sliding toothing 7b of the actuator sleeve 8 is guided with an outer sliding toothing 7a to the circulating carrier 2 in order to constitute a locking function.

In the locking function 30, the circulating carrier 2 can only be connected to the drive gearwheel 3 via a weld 21, since in the locking function 30, a load-induced torque is always transmitted between the actuator sleeve 8, which is coupled to the lateral gearwheel 5 of the differential 1, and the circulating carrier 2.

If both the separating and the locking function are required in a differential, as occurs in particular with electric axles, the one side of the circulating carrier 2 is configured as a locking function 30 and the other side as a separating function 40, as shown in FIG. 4.

Here, for the locking function 30, the circulating carrier 2 must always be connected to the drive gearwheel 3 via welding. The part of the circulating carrier 2 containing the separating function 40 may however also be connected to the drive gearwheel 3 via a press fit, as shown in FIG. 5.

To design the arrangement with as little play as possible, an embodiment according to FIG. 6 is selected.

The lift magnet 10 activates and shifts the sleeve 8 via the grooved ball bearing roller bodies in a Connect mode, in which the claw coupling is closed.

A spring pack 17b with side discs 17a at each axial end lies on the grooved ball bearing roller bodies in order to shift the sleeve 8 back into a Disconnect mode, in which the coupling is opened. The side disc 17a here lies in the wall region 17c on the grooved ball bearing 16. On the side facing the lift magnet 10, the outer ring 16a of the groove ball bearing is fixed via a latch 16b. Purely axial forces act on the grooved ball bearing outer ring 16a, in the direction of arrow a, from the spring force of the return spring 10 and the coil of the actuator. Radially, in the direction of arrow r, the grooved ball bearing outer ring 16a can move freely, so that no radial clamping can occur.

The grooved ball bearing 16 transmits shift forces with minimal bearing drag torque from the adjustment force of the lift magnet 10 to the sleeve 8. In this arrangement, the grooved ball bearing 16 is completely play-free apart from the bearing clearance of the balls. The bearing clearance can also be reduced further in order to minimise axial play of the sliding sleeve.

What is claimed is:

1. A differential including a circulating carrier with a drive gearwheel, at least one planet gearwheel rotatably mounted in the circulating carrier, and lateral gearwheels leading to respective associated side shafts of a drive axle of a vehicle and which are enmeshed with the at least one planet gearwheel, wherein a first lateral gearwheel of the lateral gearwheels has a first axially active claw coupling and can be selectively connected to the associated side shaft or can be selectively connected to the circulating carrier via a coupling arrangement that is disposed between the circulating carrier and the associated side shaft, the coupling arrangement including a first actuator sleeve having a corresponding axially active claw coupling towards the first lateral gearwheel and a radially active sliding toothing towards the side shaft, for the selective connection to the side shaft, or the circulating carrier, for the selective connection to the circulating carrier;

wherein, at a first end pointing toward the lateral gearwheel, the actuator sleeve has the corresponding axially active claw coupling pointing toward the lateral gearwheel, and a second end pointing away from the differential is displaced axially via a grooved ball bearing.

2. The differential according to claim 1, wherein the first actuator sleeve is axially displaceable by an actuator arrangement along the radially active sliding toothing.

3. The differential according to claim 1, wherein the grooved ball bearing is arranged play-free in a centering seat.

4. The differential according to claim 3, wherein one or two lateral gearwheels are selectively connected to the associated side shaft or the circulating carrier via one or two claw couplings, and the first lateral gearwheel is one of the one or two lateral gearwheels, wherein the circulating carrier is split and a part housing with a locking function is connected to the drive gearwheel exclusively via welding.

5. The differential according to claim 1, wherein the switching is actuated by a magnet with an armature plate.

6. The differential according to claim 5, wherein the magnet is arranged axially next to the circulating carrier.

7. The differential according to claim 1, wherein the circulating carrier is split, and a part housing with a separating function is connected to the drive gearwheel via a press-fit or welding.

8. The differential according to claim 1, wherein for a separating function, the first lateral gearwheel has the first axially active claw coupling towards the actuator sleeve and a bearing is disposed between the first lateral gearwheel and the associated side shaft, and the radially active sliding toothing of the first actuator sleeve is towards the associated side shaft.

9. The differential according to claim 1, wherein a second lateral gearwheel has a second axially active claw coupling and can be selectively connected to the circulating carrier or can be selectively connected to the associated side shaft via a second coupling arrangement that is disposed between the circulating carrier and the associated side shaft, the second coupling arrangement including a second actuator sleeve having a corresponding axially active claw coupling towards the second lateral gearwheel.

10. The differential according to claim 9, wherein the first lateral gearwheel can be selectively connected to the associated side shaft and the second lateral gearwheel can be selectively connected to the circulating carrier.

11. The differential according to claim 10, wherein the first actuator sleeve associated with the first lateral gearwheel has the radially active sliding toothing towards the associated side shaft, and the second actuator sleeve associated with the second lateral gearwheel has the radially active sliding toothing towards the circulating carrier.

12. The differential according to claim 11, wherein the second lateral gearwheel has a radially active sliding toothing towards the associated side shaft, and first lateral gearwheel has a bearing disposed between the first lateral gearwheel and the associated side shaft.

13. The differential according to claim 1, wherein, for a locking function, the first lateral gearwheel has the axially active claw coupling towards the actuator sleeve and the radially active sliding toothing of the first actuator sleeve is towards the circulating carrier.

14. The differential according to claim 13, wherein the circulating carrier is split and a part housing with the locking function is connected to the drive gearwheel exclusively via welding.

15. A differential including a circulating carrier with a drive gearwheel, at least one planet gearwheel rotatably mounted in the circulating carrier, and lateral gearwheels leading to respective associated side shafts of a drive axle of a vehicle and which are enmeshed with the at least one planet gearwheel, wherein a first lateral gearwheel of the lateral gearwheels has a first axially active claw coupling and can be selectively connected to the associated side shaft or can be selectively connected to the circulating carrier via a coupling arrangement that is disposed between the circulating carrier and the associated side shaft, the coupling arrangement including a first actuator sleeve having a corresponding axially active claw coupling towards the first lateral gearwheel and a radially active sliding toothing towards the side shaft, for the selective connection to the side shaft, or the circulating carrier, for the selective connection to the circulating carrier;

wherein, for a locking function, the first lateral gearwheel has the axially active claw coupling towards the actuator sleeve and the radially active sliding toothing of the first actuator sleeve is towards the circulating carrier.

16. The differential according to claim 15, wherein a separating function and the locking function are each fitted on one of the corresponding side shafts.

17. The differential according to claim 15, wherein the circulating carrier is split and a part housing with the locking function is connected to the drive gearwheel exclusively via welding.

18. The differential according to claim 15, wherein for a separating function, a second lateral gearwheel has a second axially active claw coupling towards a second actuator sleeve having a corresponding axially active claw coupling, and a bearing is disposed between the second lateral gearwheel and the associated side shaft, and a radially active sliding toothing of the second actuator sleeve is towards the associated side shaft.

19. The differential according to claim 18, wherein the separating function and the locking function are each fitted on one of the corresponding side shafts.

20. The differential according to claim 15, wherein, at a first end pointing toward the first lateral gearwheel, the actuator sleeve has the corresponding axially active claw coupling pointing toward the lateral gearwheel, and a second end pointing away from the differential is displaced axially via a grooved ball bearing.

\* \* \* \* \*